US010817723B2

(12) United States Patent
Kuo et al.

(10) Patent No.: US 10,817,723 B2
(45) Date of Patent: Oct. 27, 2020

(54) IMAGE RECOGNITION SYSTEM AND INFORMATION-DISPLAY METHOD THEREOF

(71) Applicants: Industrial Technology Research Institute, Hsinchu (TW); Intellectual Property Innovation Corporation, Hsinchu (TW)

(72) Inventors: Shin-Hong Kuo, New Taipei (TW); Yi-Shou Tsai, Taipei (TW); Kuan-Ting Chen, Yunlin County (TW); Yu-Hsiang Tsai, Hsinchu County (TW); Yu-Tang Tsai, New Taipei (TW)

(73) Assignees: INDUSTRIAL TECHNOLOGY RESEARCH INSTITUTE, Hsinchu (TW); INTELLECTUAL PROPERTY INNOVATION CORPORATION, Hsinchu (TW)

( * ) Notice: Subject to any disclaimer, the term of this patent is extended or adjusted under 35 U.S.C. 154(b) by 125 days.

(21) Appl. No.: 16/104,096

(22) Filed: Aug. 16, 2018

(65) Prior Publication Data
US 2019/0057255 A1    Feb. 21, 2019

Related U.S. Application Data

(60) Provisional application No. 62/547,236, filed on Aug. 18, 2017.

(30) Foreign Application Priority Data

Dec. 9, 2017   (TW) .............................. 106144574 A

(51) Int. Cl.
*G06K 9/00*   (2006.01)
*G06K 9/20*   (2006.01)
(Continued)

(52) U.S. Cl.
CPC ....... *G06K 9/00624* (2013.01); *G06K 9/2054* (2013.01); *G06K 9/3266* (2013.01);
(Continued)

(58) Field of Classification Search
CPC ............. G06K 9/00624; G06K 9/3266; G06K 9/2054; G06K 9/623; G06K 9/4661;
(Continued)

(56) References Cited

U.S. PATENT DOCUMENTS 9,123,285 B2    9/2015   Ko
9,514,706 B1 *  12/2016  Hsieh ....................... G09G 5/14
(Continued)

FOREIGN PATENT DOCUMENTS

TW    201348816    12/2013
TW    201419124    5/2014
(Continued)

OTHER PUBLICATIONS

Taiwan Patent Office, Office Action, Patent Application Serial No. 106144574, dated Mar. 28, 2018, Taiwan.

*Primary Examiner* — Amara Abdi

(57) ABSTRACT

An information-display method for use in a transparent display is provided. The method includes the steps of: capturing a background image of the transparent display, recognizing a target object from the background image and obtaining candidate background image sub-areas around the target object; processing the candidate background image sub-areas and generating candidate display information corresponding to each background image sub-area; calculating a color ranking score for each piece of candidate display information on each candidate background image sub-area; determining display information and a corresponding background image sub-area; determining whether the color ranking score of the display information satisfies a predeter-
(Continued)

mined condition; if so, directly displaying the display information on the background image sub-area of the transparent display; if not, adding a color feature on the display information, and displaying the display information and the color feature on the background image sub-area of the transparent display.

20 Claims, 7 Drawing Sheets

(51) Int. Cl.

| | | |
|---|---|---|
| *G06K 9/62* | (2006.01) | |
| *G06K 9/46* | (2006.01) | |
| *G06T 11/60* | (2006.01) | |
| *G06T 11/00* | (2006.01) | |
| *G06K 9/32* | (2006.01) | |
| *G06T 11/20* | (2006.01) | |

(52) U.S. Cl.
CPC ......... *G06K 9/4652* (2013.01); *G06K 9/4661* (2013.01); *G06K 9/623* (2013.01); *G06T 11/001* (2013.01); *G06T 11/203* (2013.01); *G06T 11/60* (2013.01)

(58) Field of Classification Search
CPC ..... G06K 9/4652; G06T 11/203; G06T 11/60; G06T 11/001; G06F 3/14
See application file for complete search history.

(56) References Cited

U.S. PATENT DOCUMENTS

| | | | |
|---|---|---|---|
| 9,615,054 B1 | 4/2017 | McNelley et al. | |
| 10,109,092 B1* | 10/2018 | Hitchings, Jr. | ......... G06T 11/60 |
| 2011/0289028 A1* | 11/2011 | Sato | ......... G06K 9/623 |
| | | | 706/12 |
| 2013/0265232 A1* | 10/2013 | Yun | ......... G06F 3/011 |
| | | | 345/158 |
| 2013/0314452 A1* | 11/2013 | Ko | ..... G02F 1/134336 |
| | | | 345/690 |
| 2013/0314453 A1* | 11/2013 | Ko | ......... G09G 5/10 |
| | | | 345/690 |
| 2014/0104316 A1 | 4/2014 | Sharma et al. | |
| 2014/0152869 A1 | 6/2014 | Solotko | |
| 2014/0204023 A1* | 7/2014 | Kumar | ......... G09G 3/20 |
| | | | 345/156 |
| 2015/0205451 A1* | 7/2015 | Lee | ......... G06F 3/0486 |
| | | | 715/766 |
| 2016/0033772 A1 | 2/2016 | Han | |
| 2016/0093079 A1* | 3/2016 | Grams | ......... G06T 11/60 |
| | | | 345/589 |
| 2016/0351164 A1 | 12/2016 | Hsieh et al. | |

FOREIGN PATENT DOCUMENTS

| | | |
|---|---|---|
| TW | I466094 | 12/2014 |
| TW | 201606352 | 2/2016 |
| TW | 201642244 | 12/2016 |
| TW | 201718124 | 6/2017 |

\* cited by examiner

IMAGE RECOGNITION SYSTEM AND INFORMATION-DISPLAY METHOD THEREOF

CROSS REFERENCE TO RELATED APPLICATION

This present application claims the benefit of U.S. Provisional Application No. 62/547,236 filed Aug. 18, 2017, and the present application is based on, and claims priority from, Taiwan (International) Application Serial Number 106144574, filed Dec. 19, 2017, the disclosure of which are hereby incorporated by reference herein in its entirety.

TECHNICAL FIELD

The technical field relates to image processing, and, in particular, to an image recognition system and information-display method thereof.

BACKGROUND

With recent technological advances, transparent displays have become more and more popular. A transparent display is a display that has a certain level of transparency, meaning that the background behind the display panel of the transparent display can be seen clearly through the display panel. Transparent displays can be applied on the windows of buildings, vehicles, or shops. In addition to the original transparency display functionality, corresponding information can be marked on the image displayed on the transparent display.

Using the transparency feature of the transparent display, various applications for the transparent display can be developed to implement functions not provided by non-transparent displays, but the transparency feature of the transparent display has its disadvantages. While displaying images or information on the transparent display, the display information will be affected by the background of the transparent display, resulting in lower recognizability of the display information and lower image-viewing quality of the user. When background luminance is very high or the background color or lines are too complex, the recognizability of the display image will be affected, resulting in the image-viewing quality of the transparent display being significantly reduced.

Accordingly, there is demand for an image recognition system and an information display method thereof to solve the aforementioned problem.

SUMMARY

A detailed description is given in the following embodiments with reference to the accompanying drawings.

An information-display method for use in a transparent display is provided. The method includes the steps of: capturing a background image of the transparent display; recognizing a target object from the background image of the transparent display and retrieving one or more candidate background image sub-areas around the target object; processing the one or more candidate background image sub-areas and generating one or more pieces of candidate display information corresponding to each candidate background image sub-area; calculating a color ranking score of each piece of candidate display information on each candidate background image sub-area; determining display information and a corresponding background image sub-area from the one or more pieces of candidate display information and the one or more candidate background image sub-areas, respectively; determining whether the color ranking score of the display information satisfies a predetermined condition; if the color ranking score satisfies the predetermined condition, directly displaying the display information on the background image sub-area of the transparent display; if the color ranking score does not satisfy the predetermined condition, adding a color feature on the display information and displaying the display information and the color feature on the background image sub-area of the transparent display.

An image recognition system is provided. The image recognition system includes: a transparent display, an image capturing unit, and a computation unit. The image capturing unit is configured to capture a background image of the transparent display. The computation unit is configured to recognize a target object from the background image of the transparent display and retrieve one or more candidate background image sub-areas around the target object. The computation unit further processes the one or more candidate background image sub-areas and generates one or more pieces of candidate display information corresponding to each candidate background image sub-areas. The computation unit further calculates a color ranking score of each piece of candidate display information on each candidate background image sub-area, and determines display information and a corresponding background image sub-area from the candidate display information and the candidate background image sub-areas, respectively. The computation unit further determines whether the color ranking score of the display information satisfies a predetermined condition. If the color ranking score satisfies the predetermined condition, the computation unit directly displays the display information on the background image sub-area of the transparent display. If the color ranking score does not satisfy the predetermined condition, the computation unit adds a color feature on the display information and displaying the display information and the color feature on the background image sub-area of the transparent display.

BRIEF DESCRIPTION OF DRAWINGS

The present disclosure can be more fully understood by reading the subsequent detailed description and examples with references made to the accompanying drawings, wherein.

DETAILED DESCRIPTION

Figure 1:
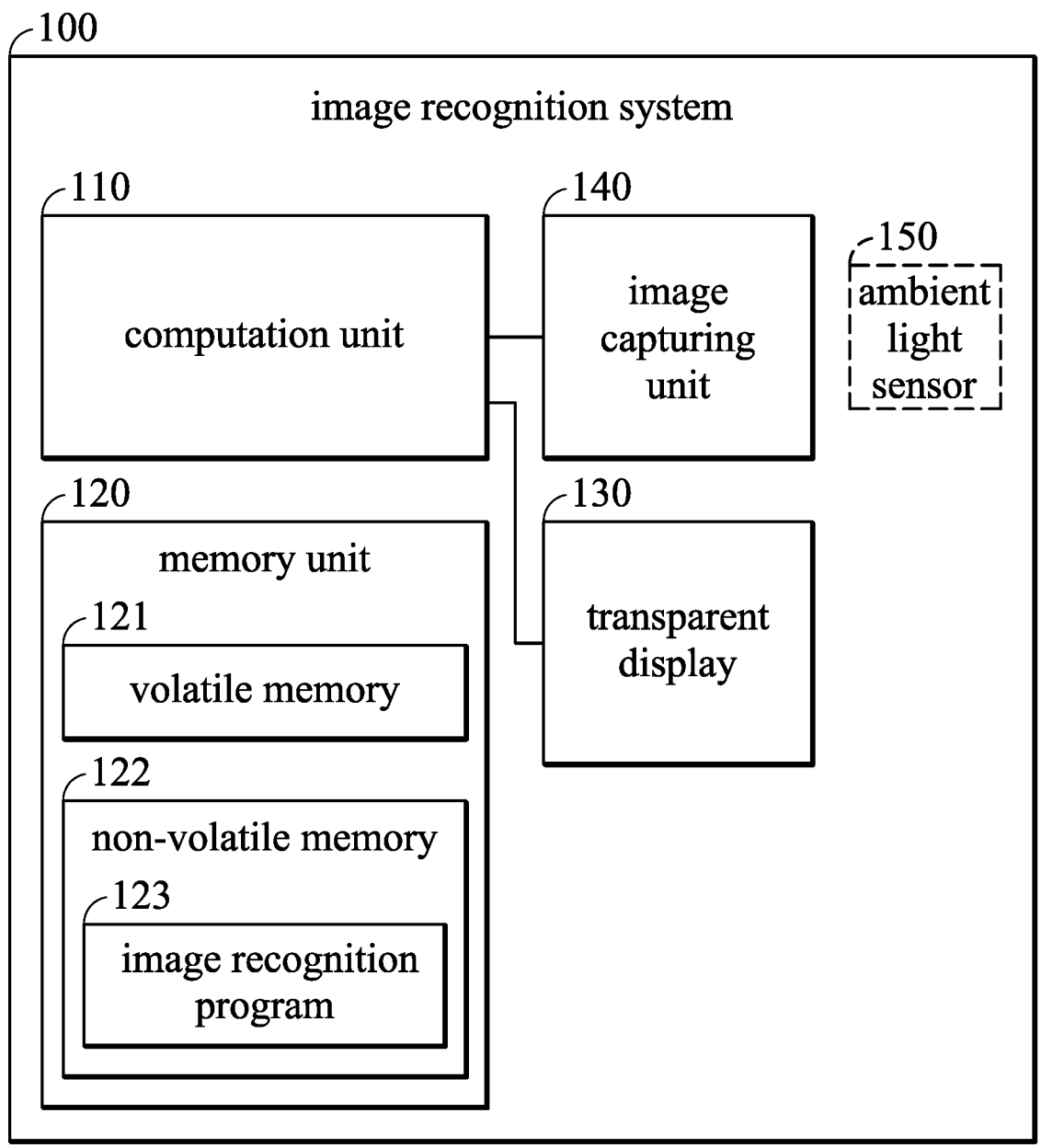
FIG. 1 is a schematic block diagram of an image recognition system in accordance with an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing FIG. 1 is a schematic block diagram of an image recognition system in accordance with an embodiment of the disclosure.

As illustrated in FIG. 1, in an embodiment, the image recognition system 100 includes a computation unit 110, a memory unit 120, a transparent display 130, and an image capturing unit 140.

The computation unit 110 is configured to process an input image according to image information of a background image to generate an output image, and display the output image on the transparent display 130.

For example, in an embodiment, the computation unit 110 may be an application-specific integrated circuit (ASIC), or a system-on-chip (SoC). It should be understood that the computation unit 110 is an overall term of multiple image-processing circuits, and the computation unit 110 may include one or more sub-circuits configured to perform different image-processing operations of an image recognition procedure. In some embodiments, the computation unit 110 may be a processor that is implemented by a central processing unit (CPU), a digital signal processor (DSP), or an image signal processor (ISP), but the disclosure is not limited thereto.

The memory unit 120 includes a volatile memory 121 and a non-volatile memory 122. For example, the non-volatile memory 122 is configured to store an image recognition program 123, and the non-volatile memory 122 may be a hard-disk drive, a flash memory, or a read-only memory, but the disclosure is not limited thereto.

The volatile memory 121 may be a static random access memory (SRAM) or a dynamic random access memory (DRAM). When the computation unit 110 is implemented by a processor, the computation unit 110 may load the image recognition program 123 from the non-volatile memory 122 to the volatile memory 121 for execution. Additionally, the volatile memory 121 may store various intermediate data during execution of the image recognition program 123 by the computation unit 110.

The transparent display 130 may be a transparent display that is implemented by technologies of a liquid-crystal display (LCD), or an organic light-emitting diode (OLED) display, but the disclosure is not limited thereto.

The image capturing unit 140 is configured to capture a background image of the image recognition system 100. For example, if the transparent display 130 is a flat transparent display, the transparent display 130 has a first side and a second side opposite to the first side. If the image capturing unit 140 is disposed on the first side of the transparent display 130, light from the scene on the second side may form an image on the image capturing unit 140 through the transparent display 130, and the formed image can be regarded as a background image. The image capturing unit 140 may be one or more cameras, a spectrometer, or a wide-angle image capturing unit, but the disclosure is not limited thereto.

In an embodiment, the computation unit 110 may analyze the background image captured by the image capturing unit 140 to retrieve image information associated with the background of the image recognition system 100, and manipulate display information (e.g., text, icons, etc.) added on the input image according to the retrieved image information.

Specifically, light of colors and scenic objects of the background of the transparent display 130 may enter the user's eyes through the transparent display 130. In other words, the resulting colors and luminance, obtained from the light of the background passing through the transparent display 130, should be added into the image information rendered by the transparent display 130, that is received by the user's eyes. Accordingly, the computation unit 110 of the present disclosure may manipulate the display information (e.g., text, icons, etc.) added into the input image according to the image information associated with the background of the image recognition system 100, thereby enhancing the recognizability of the display information.

In some embodiments, the image recognition system 100 further includes an ambient light sensor 150 configured to detect ambient light of the foreground of the transparent display 130. That is, the ambient light sensor 150 may detect the strength of the ambient light of the foreground, where the ambient light is reflected by the transparent display 130 and received by the user's eyes.

Figure 2:
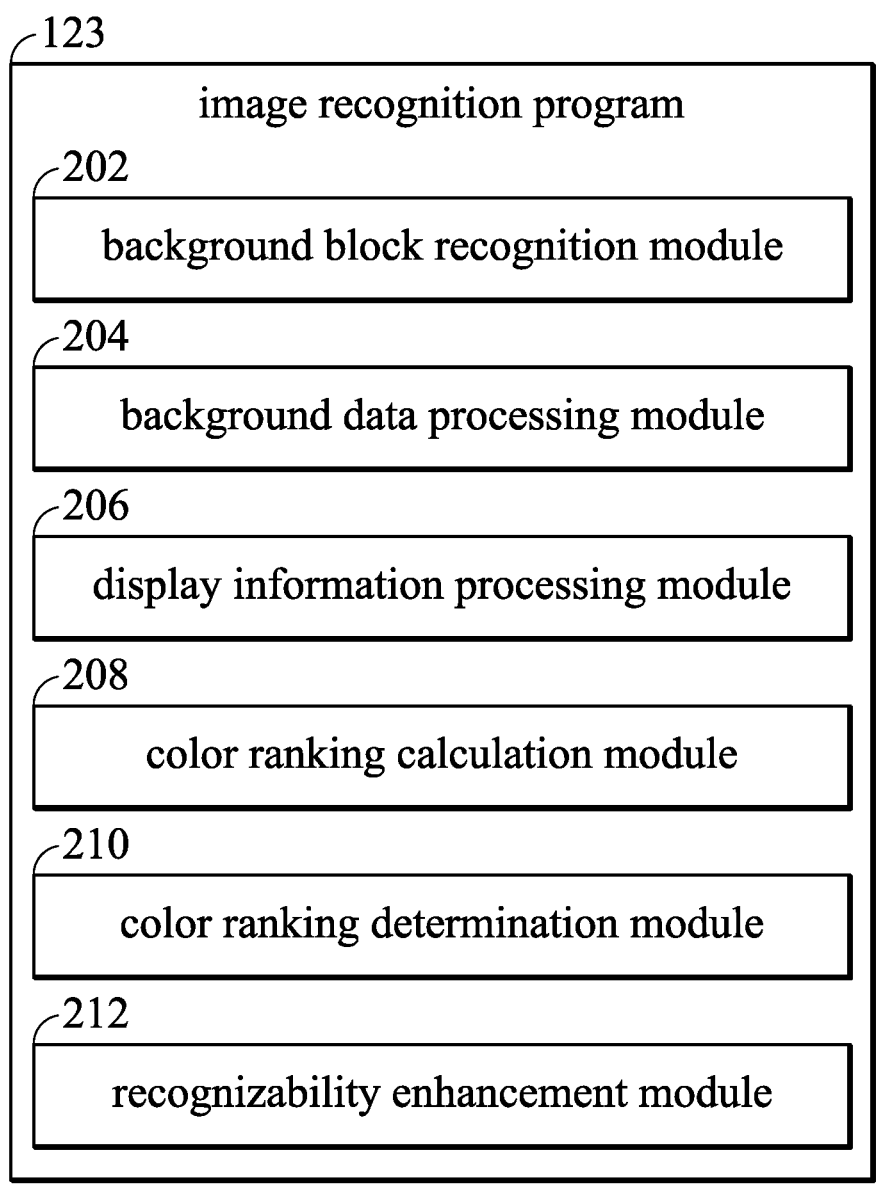
FIG. 2 is a block diagram of an image recognition program in accordance with an embodiment of the disclosure.

FIG. 2 is a block diagram of an image recognition program in accordance with an embodiment of the disclosure. In an embodiment, the image recognition program 123 may include various functional modules such as a background block recognition module 202, a background data processing module 204, a display information processing module 206, a color ranking calculation module 208, a color ranking determination module 210, and a recognizability enhancement module 212.

For example, the background block recognition module 202 may divide the background image into a plurality of background image blocks, and each background image block may be an image block have 16×16 or 32×32 pixels, but the disclosure is not limited thereto. The size of each background image block can be adjusted according to practical situations. The background block recognition module 202 may retrieve the background image from the image capturing unit 140, perform image recognition on the background image to obtain one or more target objects, and divide one or more corresponding candidate image sub-areas around each of the target objects. Specifically, each of the corresponding candidate image sub-areas around each of the target objects may include one or more background image blocks, and can be in any shape and size. Since the luminance and colors of the background image may have different variations, different candidate background image sub-areas may have different recognizabilities.

The background data processing module 204 calculates the area average value, the area peak value, and the area valley value of each candidate background image sub-area according to the luminance, hue, and chroma values of each candidate background image sub-area. For example, the area average value may indicate an average of stimulus values of three basic color components of each candidate background image sub-area. The area peak value may indicate the maximum of stimulus values of three basic color components of each candidate background image sub-area. The area valley value may indicate the minimum of stimulus values of three basic color components of each candidate background image sub-area. The calculation of a given background image sub-area Rn can be expressed as a background color characteristic matrix:

$$R_n = \begin{bmatrix} B_{1,1} & \cdots & B_{1,m} \\ \vdots & \ddots & \vdots \\ B_{m,1} & \cdots & B_{m,m} \end{bmatrix}_n$$

where each of the elements from $B_{1,1}$ to $B_{m,m}$ indicates different image characteristics of each candidate background image sub-area, such as luminance, hue, and chroma values.

The display information processing module 206 is configured to provide or generate an image characteristic matrix of various pieces of candidate display information (e.g., text or borders with different colors) as the display information color characteristics matrix DC which can be expressed as the following equation:

$$DC = \begin{bmatrix} D_{1,1} & \cdots & D_{1,m} \\ \vdots & \ddots & \vdots \\ D_{m,1} & \cdots & D_{m,m} \end{bmatrix}_n$$

where each of the elements from $D_{1,1}$ to $D_{m,m}$ indicates different image characteristics of different candidate display information, such as luminance, hue, and chroma values. For example, each piece of candidate display information can be used on the candidate background image sub-areas of each target object having different shapes and sizes, and each piece of candidate display information of each target object may be the same text or icons with different image characteristics, and the text or icons correspond to each recognized target object.

The color ranking calculation module 208 may calculate an information color matrix IC according to the display information color characteristic matrix DC from the display information processing module 206 and the background image color characteristic matrix $R_n$ from the background data processing module 204.

The information color matrix IC can be expressed by the following equation:

$$IC = \begin{bmatrix} B_{1,1} & \cdots & B_{1,m} \\ \vdots & \ddots & \vdots \\ B_{m,1} & \cdots & B_{m,m} \end{bmatrix}_n + \begin{bmatrix} D_{1,1} & \cdots & D_{1,m} \\ \vdots & \ddots & \vdots \\ D_{m,1} & \cdots & D_{m,m} \end{bmatrix}_n$$

Figure 3:
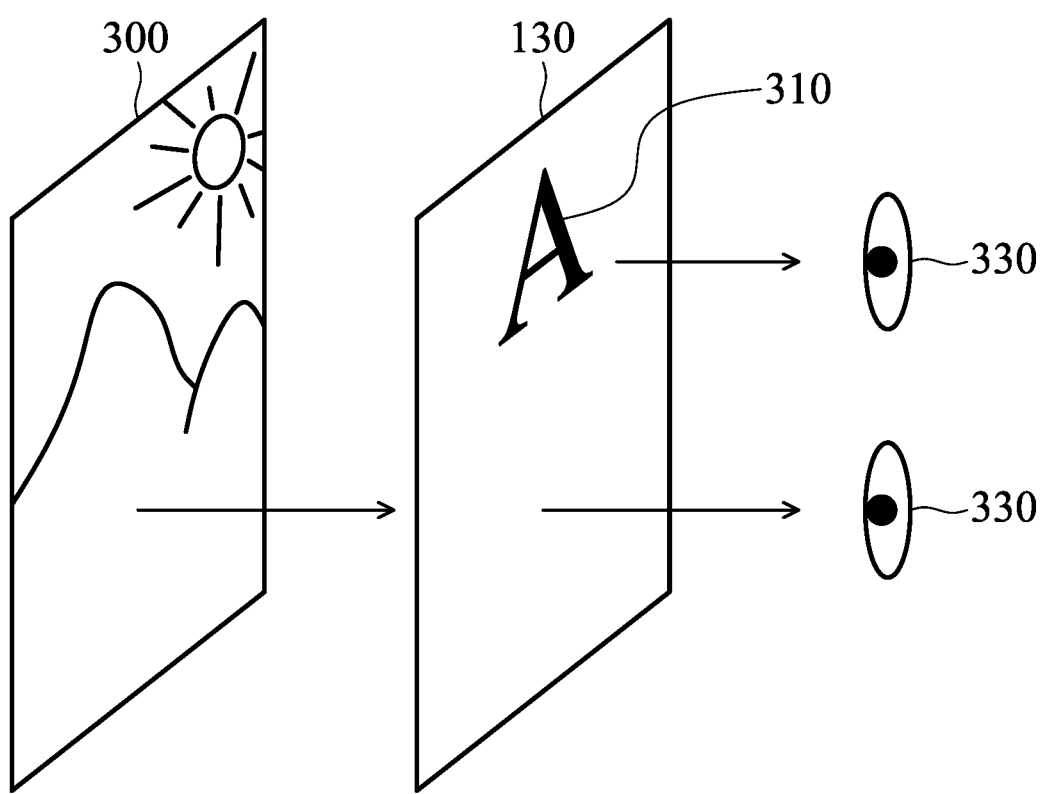
FIG. 3 is a diagram of the imaging relationships between the background image, the display information displayed on the transparent display, and user's eyes in accordance with an embodiment of the disclosure.

Referring to FIG. 3, in the aforementioned embodiments, it should be noted that the overall stimulus value ST received by the user's eyes 330 from the transparent display 130 can be simplified using the following equation:

ST=BST*λ+DST where the overall stimulus value ST includes the stimulus values of the red light, green light, and blue light (e.g., tristimulus values) actually received by the user's eyes 330. BST denotes an overall stimulus value (e.g., a first stimulus value) including the stimulus values $BST_R$, $BST_G$, and $BST_B$ respectively denoting the stimulus values of the red light, green light, and blue light of the background image 300; λ includes the transmittance values $\lambda_R$, $\lambda_G$, and $\lambda_B$ respectively denoting the substrate transmittance values of the red light, green light, and blue light for the transparent display 130; DST denotes an overall stimulus value (e.g., a second stimulus value) including the stimulus values $DST_R$, $DST_G$, and $DST_B$ respectively denoting the stimulus values of the display information 310 for the red light, green light, and blue light actually received by the user's eyes 330 through the transparent display 130. It should be noted that the stimulus values for different color channels are calculated separately. Briefly, the color ranking calculation module 208 may calculate the tristimulus value according to the first stimulus value, the second stimulus value, and the substrate transmittance values of the red light, green light, and blue light for the transparent display 130.

In an embodiment, the color ranking calculation module 208 may evenly sample the colors within the color space of the transparent display 130 as a display information color group, and performs a matrix calculation with the background data and the display information color group, thereby reducing the calculation time required by the matrix calculation.

Specifically, after performing the aforementioned matrix calculation, the color ranking calculation module 208 may obtain a color ranking score for each piece of candidate display information of each candidate background image sub-area. For example, the color ranking score CR can be expressed by the following equation:

CR=LC*w1+HC*w2+AC*w3 where w1, w2, and w3 are weighting coefficients between 0.5 and 1; LC denotes the luminance contrast; HC denotes the hue contrast; and AC denotes the area contrast. In some embodiments, the color ranking calculation module 208 may consider one or more of the luminance contrast LC, the hue contrast HC, and the area contrast AC.

In an embodiment, the color contrasts of different color channels in the RGB color space are calculated separately. For example, $R_S$, $G_S$, and $B_S$ denote the luminance values of three primary color components (i.e., red, green, and blue colors) rendered by the transparent display 130. $R_B$, $G_B$, and $R_B$ denote the luminance values of three primary color components (i.e., red, green, and blue colors) of the background light passing through the transparent display 130. $R_{max}$, $G_{max}$, and $R_{max}$ denote the maximum luminance values of three primary color components (i.e., red, green, and blue colors) rendered by the transparent display 130. For example, the color ranking calculation module 208 may calculate the color contrast values $R_{RGB}$, $G_{RGB}$, and $B_{RGB}$ of the red light, green light, and blue light of the display information in the RGB color space, and the color contrast values $R'_{RGB}$, $G'_{RGB}$, and $B'_{RGB}$ of the red light, green light, and blue light of the background image in the RGB color space with the following equations:

$$R_{RGB} = \frac{R_s + R_B}{R_{max}}$$

$$G_{RGB} = \frac{G_s + G_B}{G_{max}}$$

$$B_{RGB} = \frac{B_s + B_B}{B_{max}}$$

$$R'_{RGB} = \frac{R_B}{R_{max}}$$

$$G'_{RGB} = \frac{G_B}{G_{max}}$$

-continued $$B'_{RGB} = \frac{B_B}{B_{max}}$$

Then, the color ranking calculation module 208 calculates the following equations:

$$R_{RGB} \leq 0.03928, \overline{R} = \frac{R_{RGB}}{12.92}$$

$$R'_{RGB} \leq 0.03928, \overline{R}' = \frac{R'_{RGB}}{12.92}$$

$$G_{RGB} \leq 0.03928, \overline{G} = \frac{G_{RGB}}{12.92}$$

$$G'_{RGB} \leq 0.03928, \overline{G}' = \frac{G'_{RGB}}{12.92}$$

$$B_{RGB} \leq 0.03928, \overline{B} = \frac{B_{RGB}}{12.92}$$

$$B'_{RGB} \leq 0.03928, \overline{B}' = \frac{B'_{RGB}}{12.92}$$

$$R_{RGB} > 0.03928, \overline{R} = \left(\frac{R_{RGB} + 0.055}{1.055}\right)^{2.4}$$

$$R'_{RGB} > 0.03928, \overline{R}' = \left(\frac{R'_{RGB} + 0.055}{1.055}\right)^{2.4}$$

$$G_{RGB} > 0.03928, \overline{G} = \left(\frac{G_{RGB} + 0.055}{1.055}\right)^{2.4}$$

$$G_{RGB} > 0.03928, \overline{G}' = \left(\frac{G'_{RGB} + 0.055}{1.055}\right)^{2.4}$$

$$B_{RGB} > 0.03928, \overline{B} = \left(\frac{B_{RGB} + 0.055}{1.055}\right)^{2.4}$$

$$B'_{RGB} > 0.03928, \overline{B}' = \left(\frac{B'_{RGB} + 0.055}{1.055}\right)^{2.4}$$

It should be noted that the color ranking calculation module 208 considers the correlation between the hue and chroma in the aforementioned equations. In addition, it should be understood that the various parameters (e.g., 0.03928, and 12.92) used in the aforementioned equations are for purposes of description, and the disclosure is not limited to the aforementioned numeric values. At last, the color ranking calculation module 208 may calculate color ranking scores L and L' according to the color components, and the color ranking scores L and L' can be expressed by the following equations:

$$L = 0.2126\overline{R} + 0.7152\overline{G} + 0.0722\overline{B}$$

$$L = 0.2126\overline{R}' + 0.7152\overline{G}' + 0.0722\overline{B}'$$

Briefly, for each piece of candidate display information, the color ranking calculation module 208 may calculate the color ranking score of each piece of candidate display information for each candidate background image sub-area. In addition, it should be understood that the parameters for each color channel (e.g., 0.2126, 0.7152, and 0.0722) are for purposes of description, and the disclosure is not limited to the aforementioned numeric values.

In an embodiment, the color ranking calculation module 208 may divide the overall luminance value of the transparent display 130 by the overall background luminance value to obtain the luminance contrast LC. Specifically, the overall luminance value of the transparent display 130 can be obtained by calculating the summation of the overall luminance value AL of the three primary color components rendered by the substrate of the transparent display 130, the background luminance LB passing through the transparent display 130, and the reflection luminance LR (e.g., can be estimated using the strength of the ambient light detected by the ambient light sensor 150 in the user's region) of the transparent display 130 in the user's region. The overall background luminance value can be calculated by adding the background luminance LB passing through the transparent display 130 to the reflection luminance LR of the transparent display 130 in the user's region. In other words, the luminance contrast can be calculated by the following equation:

$$LC = \frac{(AL + LB + LR)}{(LB + LR)}$$

With regard to the area contrast AC, the color ranking calculation module 208 may calculate the ratio (e.g., calculated by one dimensional length) of each piece of candidate display information occupied in each candidate background image sub-area to obtain the area contrast AC.

The color ranking determination module 210 may determine the candidate display information having the highest color ranking score and the corresponding candidate background image sub-area (e.g., the candidate display information having the maximum chroma contrast and its corresponding candidate background image sub-area) as the display information and the background image sub-area to be displayed on the transparent display 130, and determine whether the highest color ranking score (e.g., the maximum chroma contrast) satisfies a requirement such as a specific condition. For example, according to the Weber-Fechner Law, the human eye is less sensitive to light having a higher luminance value. In other words, the color ranking determination module 210 may determine whether the maximum chroma contrast is sufficient for the user to clearly recognize the candidate display information having the maximum chroma contrast. If so, the candidate display information having the maximum chroma contrast can be displayed on the transparent display 130. If not, the recognizability enhancement module 212 will enhance the recognizability of the candidate display information.

The recognizability enhancement module 212 may add one or more color features to the display information having an insufficient color ranking score, thereby increasing the recognizability of the display information to be displayed. For example, the color ranking score of text of a single color may be limited, and may be easily affected by the light and colors of the background. If the color ranking score of the display information (e.g., text) of a single color is insufficient, the recognizability enhancement module 212 may add corresponding color features to the text of the display information, such as adding borders on the text or painting colors on the block at which the text is located, thereby increasing the recognizability of the text of the display information. In the present disclosure, various methods for adding color features to the display information are provided, and the details will be described later.

Figure 4:
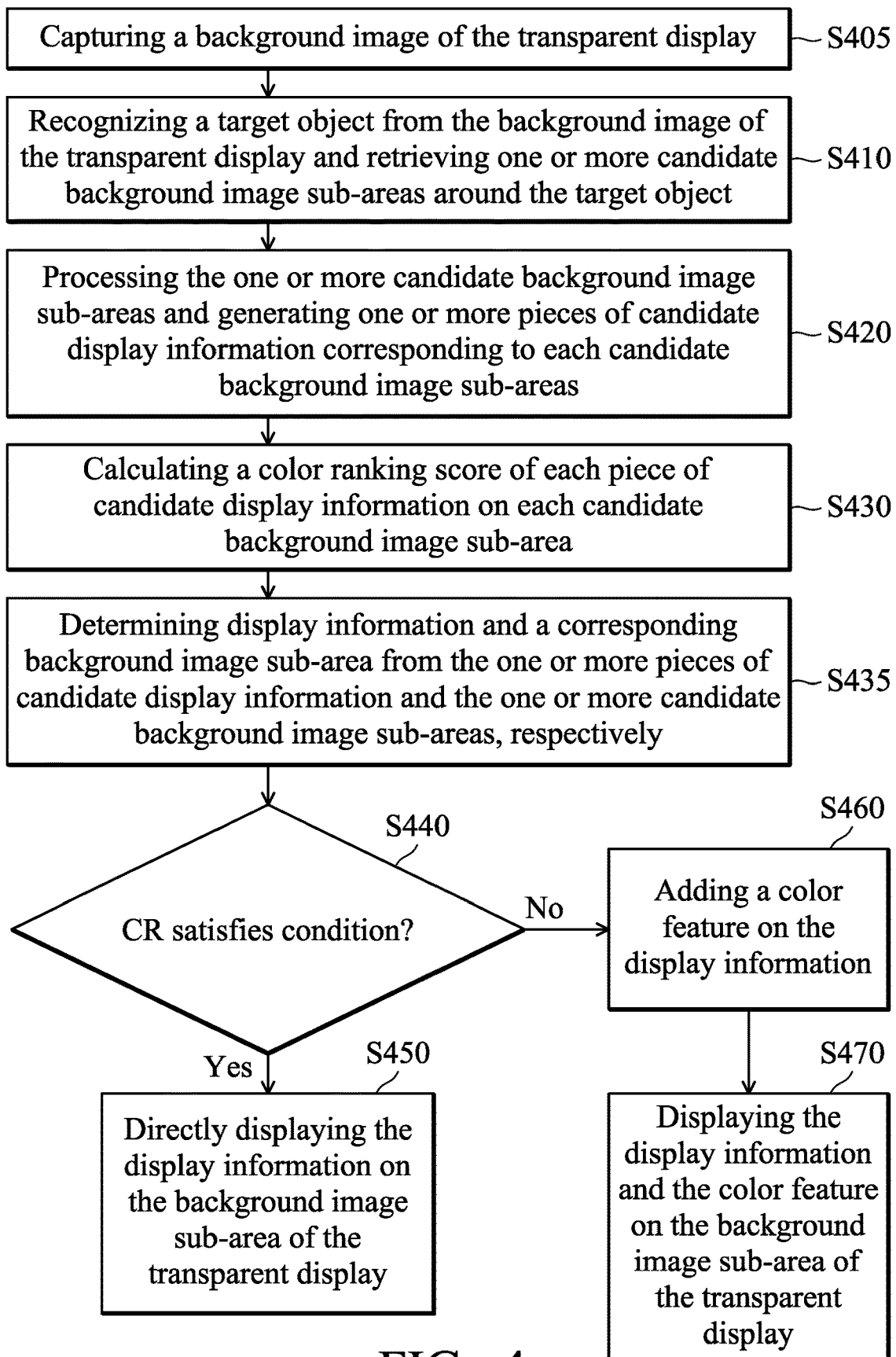
FIG. 4 is a flow chart of an information-display method in accordance with an embodiment of the disclosure.

FIG. 4 is a flow chart of an information-display method in accordance with an embodiment of the disclosure.

In step S405, a background image of the transparent display 130 is captured.

In step S410, a target object of the background image is recognized, and one or more candidate background image sub-areas around the target object are obtained. For example, the image capturing unit 140 may capture the background image of the image recognition system 100. The background block recognition module 202 may divide the background image into one or more background image blocks, and recognize one or more target objects from the background image, wherein each target object may have one or more candidate background image sub-areas, and each candidate background image sub-area may include one or more background image blocks.

In step S420, the one or more candidate background image sub-areas are processed, and one or more pieces of candidate display information corresponding to each candidate background image sub-area are generated. The background data processing module 204 may calculate the color features of the one or more candidate background image sub-areas, and the display information processing module 206 may calculate the color features of the pieces of candidate display information, wherein the color features of each candidate background image sub-area and those of each piece of candidate display information can be expressed by a respective color feature matrix.

In step S430, a color ranking score of each piece of candidate display information in each candidate background image sub-area is calculated. For example, each piece of candidate display information in each candidate background image sub-area has a corresponding color ranking score. The information color matrix can be obtained after the color ranking calculation module 208 performs matrix calculation using the background color characteristic matrix of each candidate background image sub-area and the display information color characteristic matrix.

In step S435, display information and a corresponding background image sub-area are determined from the one or more pieces of candidate display information and the one or more candidate background image sub-areas, respectively. For example, the information color matrix indicates the color contrast of each piece of candidate display information in each candidate background image sub-area. In an embodiment, in order to let the user recognize the display information on the transparent display 130 more clearly, the candidate display information having the highest color ranking score (e.g., having the highest color contrast) and the corresponding candidate background image sub-area should be respectively selected as the display information and the corresponding background image sub-area to be displayed on the transparent display 130.

In step S440, it is determined whether the color ranking score of the determined display information satisfies a predetermined condition. For example, since each piece of candidate display information in each candidate background image sub-area has a corresponding color ranking score, the higher the color ranking score is, the better the recognizability is. The color ranking determination module 210 may determine whether the display information having the highest color ranking score is sufficient for clear recognition by the user, such as determining whether the highest color ranking score is larger than a predetermined value. If the color ranking score satisfies the predetermined condition, it indicates that the corresponding display information displayed on the transparent display 130 can be clearly recognized by the user, and the display information is displayed on the background image sub-area of the transparent display 130 (step S450). If the color ranking score does not satisfy the predetermined condition, it indicates that the corresponding display information displayed on the transparent display 130 cannot be clearly recognized by the user, and step S460 is performed.

In step S460, a color feature is added to the display information. The recognizability enhancement module 212 may add one or more color features to the display information having an insufficient color ranking score, thereby improving the recognizability of the display information. For example, the color ranking score of text of a single color may be limited, and may be easily affected by the light and colors of the background. If the color ranking score of the display information (e.g., text) of a single color is insufficient, the recognizability enhancement module 212 may add a corresponding color feature to the text of the display information, such as adding borders or painting colors on the image block (i.e., background image sub-area) at which the text is located, thereby increasing the recognizability of the text of the display information.

In step S470, the display information and the color feature are displayed on the background image sub-area of the transparent display 130.

Figure 5:
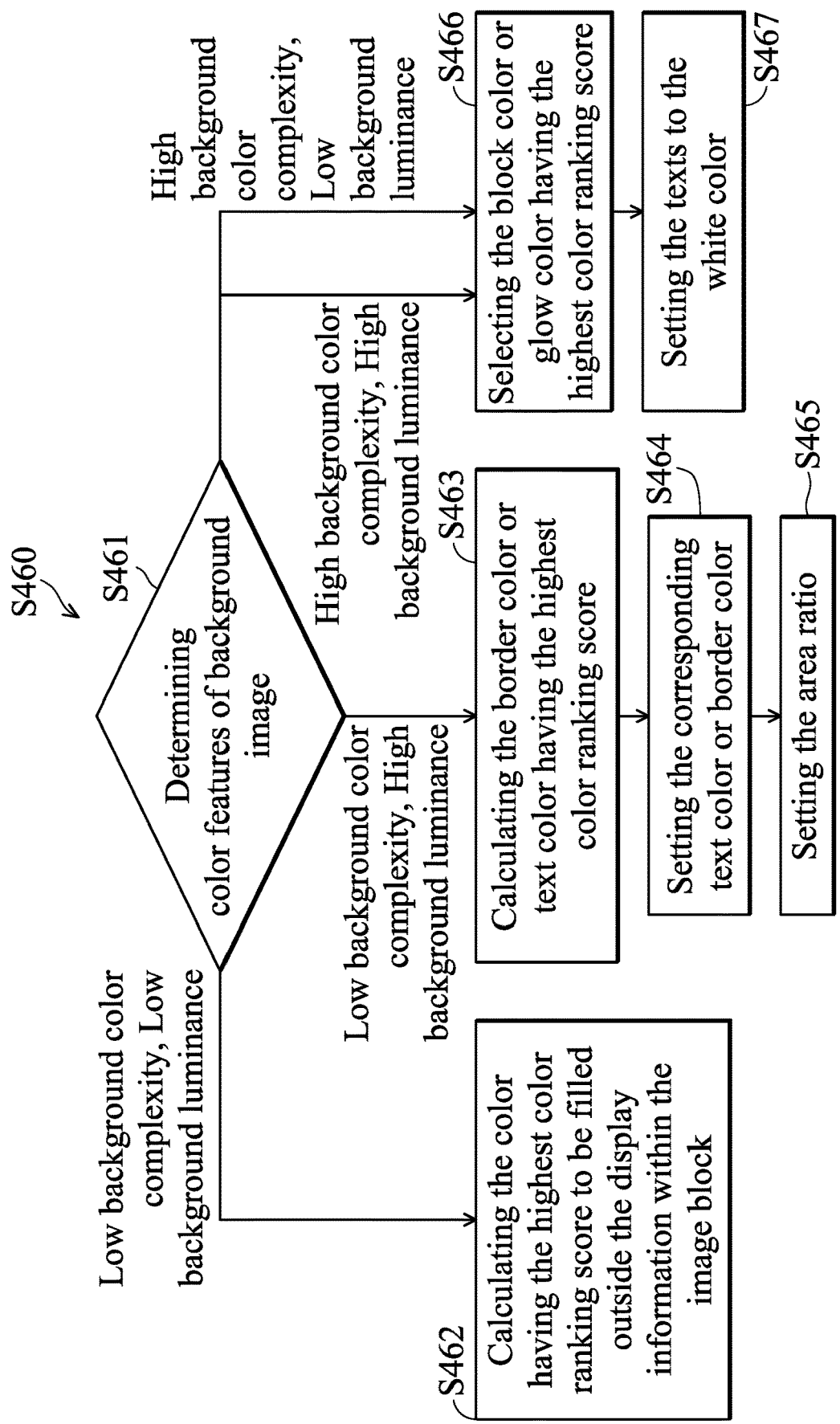
FIG. 5 is a detailed flow chart of step S460 in accordance with the embodiment of FIG. 4.

FIG. 5 is a detailed flow chart of step S460 in accordance with the embodiment of FIG. 4. When it is determined that the color feature should be added to the display information to improve the recognizability, step S460 is performed. Step S460 can be divided into steps S461~S467. In step S461, the color features of the background image are determined. For example, there are four conditions of the color features of the background image, such as (1) low background color complexity and low background luminance; (2) low background color complexity and high background luminance; (3) high background color complexity and high background luminance; and (4) high background color complexity and low background luminance. When it is determined that the color features of the background image are in the first condition, step S462 is performed. When it is determined that the color features of the background image are in the second condition, step S463 is performed. When it is determined that the color features of the background image are in the third condition or the fourth condition, step S466 is performed.

Figure 6A:
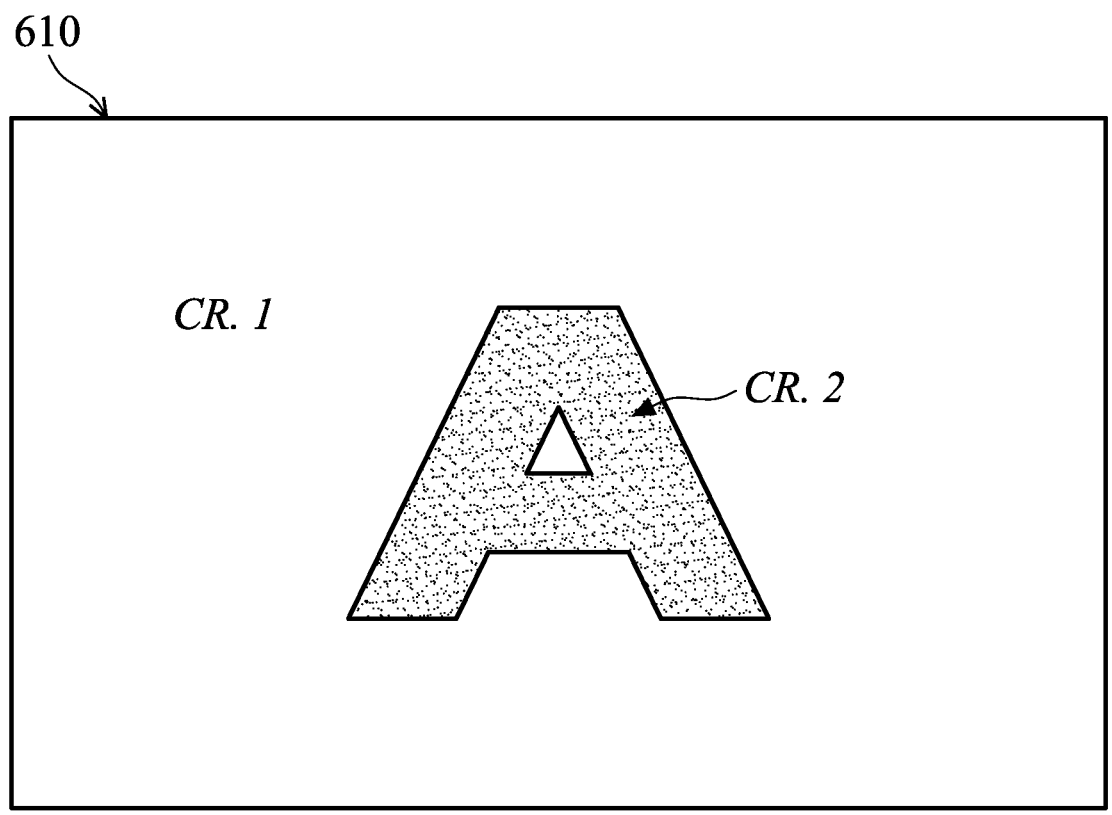
FIG. 6A is a diagram of the distribution of the color ranking scores of the background image sub-area and the display information in accordance with an embodiment of the disclosure.

In step S462, the color having the highest color ranking score to be filled outside the display information within the image block is calculated, and the hollowed display information is displayed. In the scene having low background color complexity and low background luminance is low, although the recognizability of the text of the display information may be insufficient, it is easier for the user to recognize the display information (e.g., text information) displayed on the transparent display 130 in this condition, and thus the display information having the highest color ranking score or the image block in the color having the highest color ranking score with the hollowed display information can be directly displayed on the transparent display 130. In an embodiment, as illustrated in FIG. 6A, the background of the background image sub-area 610 has a color ranking score CR.1, and the display information has a color ranking score CR.2. The recognizability enhancement module 212 may directly display the display information in the color having the highest color ranking score on the transparent display 130. In another embodiment, the recognizability enhancement module 212 may paint the image block, which includes the hollowed display information, with the color having the highest color ranking score, and directly display the image block on the transparent display 130. That is, the image block in the color having the highest color ranking score is selected, and the hollowed display information (e.g., text information) is displayed within the image block, where the color of the display information may be the same with that of the background color.

In steps S463-S465, the recognizability enhancement module 212 may add borders on the text having the highest color ranking score to improve the recognizability of the text.

In step S463, the border color or text color having the highest color ranking score is calculated. For example, text of the display information in the color having the highest color ranking score may have similar color or contrast with those of the background, or may be affected by high background luminance, resulting in poor recognizability. Meanwhile, a text border can be inserted between the text and the background, and the color of the text border is contrary to those of the text and the background. In other words, the color of the text border is selected based on the contrasting color to the text and the background, and has the maximum recognizability in comparison with the colors of the text and the background.

In step S464, the corresponding text color or border color is set. For example, if the border color (e.g., a first color) having the highest color ranking score is selected in step S463, the text color (e.g., a second color) having the maximum recognizability (e.g., highest hue contrast) in comparison with the selected border color is selected in step S464. Conversely, if the text color (e.g., a second color) having the highest color ranking score is selected in step S463, the border color (e.g., a first color) having the maximum recognizability (e.g., highest hue contrast) in comparison with the selected text color is selected in step S464. Briefly, the border color is the first color corresponding to the highest color ranking score, and the second color of the display information has the maximum recognizability in comparison with the first color.

Figure 6B:
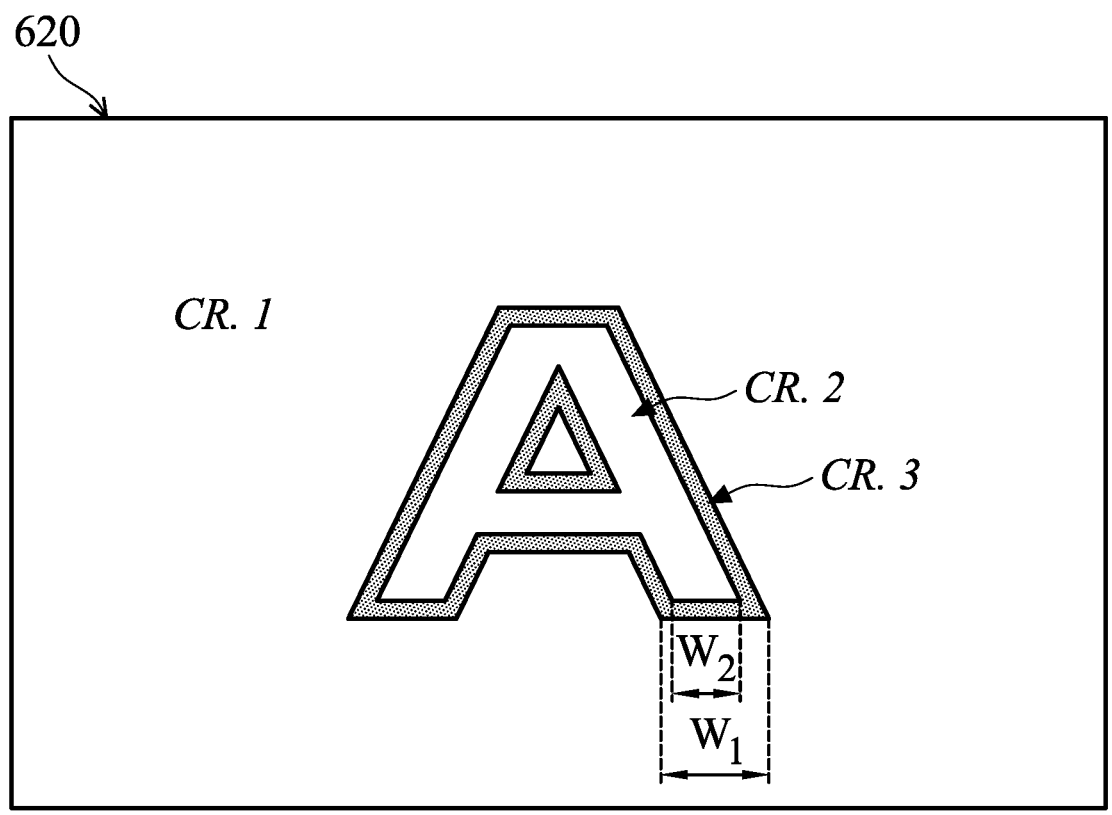
FIG. 6B is a diagram of the distribution of the color ranking scores of the background image sub-area, the display information, and the text border in accordance with an embodiment of the disclosure.

In step S465, the area ratio is selected. For example, after determination of the text color and the border color, the ratio between the border size and the text size is further determined. As illustrated in FIG. 6B, the background of the background image sub-area 620 has a color ranking score CR.1, and the display information has a color ranking score CR.2, and the border has a color ranking score CR.3. The distribution of the color ranking scores CR.1, CR.2, and CR.3 may be "high-high-low" or "low-low-high", and thus the recognizability of the display information can be further enhanced.

Briefly, in steps S463~S465, the recognizability enhancement module 212 may calculate the border color or text color having the highest color ranking score, and then set the relative text color or border color. That is, if the border color having the highest color ranking score is selected in step S463, the relative text color is selected in step S464. If the text color having the highest color ranking score is selected in step S463, the relative border color is selected in step S464. Specifically, the selection of the text color or border color should satisfy one of two criteria such as the distribution of CR.1, CR.2, and CR.3 being "high-high-low" or "low-low-high".

In step S466, the block color or glow color having the highest color ranking score is selected.

In step S467, the text color is set to white. For example, when the background color is complex, no matter whether the transparent display 130 is indoors or outdoors or whether any color of the display information is used or the text border is added, it still results in poor recognizability for the user. Accordingly, the recognizability enhancement module 212 will calculate the color having the maximum hue contrast, and the maximum hue contrast indicates two colors having the farthest distance in the color coordinates of the color space. The recognizability enhancement module 212 further paints the background image sub-area (i.e., image block) with the block color, and set the text in the background image sub-area (i.e., image block) to the white color. For example, the hue of the block color has the maximum hue contrast in comparison with the hue of the background image sub-area, and the text in the white color has the maximum luminance contrast in comparison with the background image sub-area. Accordingly, it is easier for the user to recognize the display information in the background image sub-area. Specifically, the background image sub-area corresponding to the display information can be painted as an image block having the block color, and the first hue of the block color has a maximum hue contrast in comparison with a second hue of the background image sub-area. That is, in the condition of high background color complexity, no matter whether the background luminance is high or low, steps S466 and S467 can be performed to add effects such as text in the image block, or text with a glowing effect to enhance the recognizability of the display information. In some embodiments, the background image sub-area may be in the form of frame lines similar to the shape of the scene or a specific geometric shape, and the color, luminance, and the width of the background image sub-area appropriate for rendering by the transparent display 130 can be obtained after calculation.

In some embodiments, the recognizability enhancement module 212 may add an outer frame or an indication mark on the target object of the background image. The outer frame may be in the form of frame lines similar to the shape of the scene or a specific geometric shape, and the symbol color and luminance of the outer frame or the indication mark appropriate for rendering by the transparent display 130 can be obtained after calculation.

In some embodiments, the image recognition system 100 may execute the information-display method to select an appropriate display color. That is, the recognizability enhancement module 212 may add additional display information in a display color having high recognizability as a label in the original display information according to the background color.

In some embodiments, the image recognition system 100 may execute the information display method to select an appropriate text pattern color. That is, the recognizability enhancement module 212 may add additional text patterns and colors on the text of the display information, thereby improving the recognizability of the text of the display information.

In some embodiments, the image recognition system 100 may execute the information display method to select an appropriate hollowed block color and size, thereby improving the recognizability of the text of the display information.

In some embodiments, the image recognition system 100 may execute the information display method to select an appropriate text shadow color and size. That is, an appropriate shadow in the text shadow color can be rendered around the text of the display information, thereby improving the recognizability of the text of the display information.

In some embodiments, the image recognition system 100 may execute the information display method to select an appropriate glow color and size. That is, an appropriate glow in the selected glow color can be rendered around the text of the display information, thereby improving the recognizability of the text of the display information.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An information-display method for use in a transparent display, the method comprising:
    capturing a background image of the transparent display;
    recognizing a target object from the background image of the transparent display and retrieving one or more candidate background image sub-areas around the target object;
    processing the one or more candidate background image sub-areas and generating one or more pieces of candidate display information corresponding to each candidate background image sub-area;
    calculating a color ranking score for each piece of candidate display information on each candidate background image sub-area;
    determining display information and a corresponding background image sub-area from the one or more pieces of candidate display information and the one or more candidate background image sub-areas, respectively; and
    determining whether the color ranking score of the display information satisfies a predetermined condition;
    if the color ranking score satisfies the predetermined condition, directly displaying the display information on the background image sub-area of the transparent display;
    if the color ranking score does not satisfy the predetermined condition, adding a color feature on the display information and displaying the display information and the color feature on the background image sub-area of the transparent display.

2. The information-display method as claimed in claim 1, further comprising:
    calculating a luminance contrast, a hue contrast, and an area contrast for each piece of candidate display information on each candidate background image sub-area; and
    calculating the color ranking score of each piece of candidate display information on each candidate background image sub-area according to the calculated luminance contrast, hue contrast, and area contrast.

3. The information-display method as claimed in claim 2, further comprising:
    dividing an overall luminance value of the transparent display by an overall background luminance value of the background image passing through the transparent display to obtain a luminance contrast.

4. The information-display method as claimed in claim 2, further comprising:
    calculating a first stimulus value for each of the red light, green light, and blue light of the background image to a user's eyes;
    calculating a second stimulus value for each of the red light, green light, and blue light of the display information to the user's eyes;
    calculating a respective stimulus value for the red light, green light, and blue light according to the first stimulus value, the second stimulus value, and a substrate transmittance of the transparent display corresponding to the red light, green light, and blue light, wherein the stimulus values of the red light, green light, and blue light form an overall stimulus value.

5. The information-display method as claimed in claim 4, further comprising:
    calculating an area average value, an area peak value, and an area valley value for each candidate background image sub-area, wherein the area average value is an average value of the stimulus values of the red light, green light, and blue light in each candidate background image sub-area, and the area peak value is the maximum of the stimulus values of the red light, green light, and blue light in each candidate background image sub-area, and the area valley value is the minimum of the stimulus values of the red light, green light, and blue light in each candidate background image sub-area.

6. The information-display method as claimed in claim 1, wherein the display information displayed on the transparent display has the highest color ranking score.

7. The information-display method as claimed in claim 6, wherein the color feature includes a display color having high recognizability, a border color, a block color, a symbol color, a text shadow color, a glow color, a hollowed block color, or a text pattern color.

8. The information-display method as claimed in claim 7, wherein the displaying information is in a color having a maximum recognizability.

9. The information-display method as claimed in claim 7, wherein the border color is a first color having the highest color ranking score, and a text color of the display information is a second color having the maximum recognizability relative to the first color.

10. The information-display method as claimed in claim 7, wherein the background image sub-area corresponding to the display information is painted as an image block in the block color, and a first hue of the block color has a maximum hue contrast in comparison with a second hue of the background image sub-area, and a first luminance value of the display information in the image block has a maximum luminance contrast in comparison with a second luminance value of the background image sub-area.

11. An image recognition system, comprising:
    a transparent display;
    an image capturing unit, configured to capture a background image of the transparent display; and
    a computation unit, configured to recognize a target object from the background image of the transparent display and retrieve one or more candidate background image sub-areas around the target object,
    wherein the computation unit further processes the one or more candidate background image sub-areas and generates one or more pieces of candidate display information corresponding to each candidate background image sub-area, wherein the computation unit further calculates a color ranking score of each piece of candidate display information on each candidate background image sub-area, and determines display information and a corresponding background image sub-area from the one or more pieces of candidate display information and the one or more candidate background image sub-areas, respectively, wherein the computation unit further determines whether the color ranking score of the display information satisfies a predetermined condition, if the color ranking score satisfies the predetermined condition, the computation unit directly displays the display information on the background image sub-area of the transparent display;

if the color ranking score does not satisfy the predetermined condition, the computation unit adds a color feature on the display information and displaying the display information and the color feature on the background image sub-area of the transparent display.

12. The image recognition system as claimed in claim 11, wherein the computation unit further calculates a luminance contrast, hue contrast, and area contrast of each piece of candidate display information on each candidate background image sub-area, and calculates the color ranking score of each piece of candidate display information on each candidate background image sub-area according to the calculated luminance contrast, hue contrast, and area contrast.

13. The image recognition system as claimed in claim 12, wherein the computation unit further divides an overall luminance value of the transparent display by an overall background luminance value of the background image passing through the transparent display to obtain the luminance contrast.

14. The image recognition system as claimed in claim 12, wherein the computation unit further calculates a first stimulus value for each of the red light, green light, and blue light of the background image to a user's eyes, calculates a second stimulus value for each of the red light, green light, and blue light of the display information to the user's eyes, and calculates a respective stimulus value for the red light, green light, and blue light according to the first stimulus value, the second stimulus value, and a substrate transmittance of the transparent display corresponding to the red light, green light, and blue light, wherein the stimulus values of the red light, green light, and blue light form an overall stimulus value.

15. The image recognition system as claimed in claim 14, wherein the computation unit further calculates an area average value, an area peak value, and an area valley value of each candidate background image sub-area, wherein the area average value is an average value of the stimulus values of the red light, green light, and blue light in each candidate background image sub-area, and the area peak value is the maximum of the stimulus values of the red light, green light, and blue light in each candidate background image sub-area, and the area valley value is the minimum of the stimulus values of the red light, green light, and blue light in each candidate background image sub-area.

16. The image recognition system as claimed in claim 11, wherein the display information displayed on the transparent display has the highest color ranking score.

17. The image recognition system as claimed in claim 16, wherein the color feature includes a display color having high recognizability, a border color, a block color, a symbol color, a text shadow color, a glow color, a hollowed block color, or a text pattern color.

18. The image recognition system as claimed in claim 17, wherein the displaying information is in a color having a maximum recognizability.

19. The image recognition system as claimed in claim 17, wherein the border color is a first color having the highest color ranking score, and a text color of the display information is a second color having the maximum recognizability relative to the first color.

20. The image recognition system as claimed in claim 17, wherein the computation unit further paints the background image sub-area corresponding to the display information as an image block in the block color, and a first hue of the block color has a maximum hue contrast in comparison with a second hue of the background image sub-area, and a first luminance value of the display information in the image block has a maximum luminance contrast in comparison with a second luminance value of the background image sub-area.

* * * * *